US012671449B1

(12) United States Patent
Sun et al.

(10) Patent No.: US 12,671,449 B1
(45) Date of Patent: Jun. 30, 2026

(54) WIRELESS CHANNEL MEASUREMENT NOISE REMOVING METHOD

(71) Applicant: CABLE TELEVISION LABORATORIES, INC., Louisville, CO (US)

(72) Inventors: Ruoyu Sun, Westminster, CO (US); Dorin Gheorghe Viorel, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 26 days.

(21) Appl. No.: 18/970,234

(22) Filed: Dec. 5, 2024

Related U.S. Application Data

(60) Provisional application No. 63/607,621, filed on Dec. 8, 2023.

(51) Int. Cl.
H04B 1/10 (2006.01)
H04B 17/318 (2015.01)
(52) U.S. Cl.
CPC ......... H04B 1/1027 (2013.01); H04B 17/318 (2015.01)
(58) Field of Classification Search
CPC ........................... H04B 17/318; H04B 1/1027
See application file for complete search history.

(56) References Cited

U.S. PATENT DOCUMENTS

2016/0277898 A1* 9/2016 Bengtsson ............ G01S 5/0273

OTHER PUBLICATIONS

Sun et al., MIMO Channel Capacity Measurements in an Indoor-Office Environment at 6 and 37 GHZ, 6 pages.
Sun et al., Experimental FWA MIMO Capacity Analysis in 6 and 37 GHz Bands, 2024, 17 pages.
Gebremedhin, et al., Frequency Domain Channel Characteristics in an Outdoor-to-Indoor Environment at 6 and 37 GHz, 5 pages.

* cited by examiner

*Primary Examiner* — Rahel Guarino
(74) *Attorney, Agent, or Firm* — Volpe Koenig

(57) ABSTRACT

Methods and apparatuses for noise removal are provided. A noise removal method may determine multiple channel impulse responses (CIRs) and multiple power delay profiles (PDPs) corresponding to the CIRs collected at multiple spatial-separated positions. Initially, the noise removal method may apply a dynamic noise threshold based on a false-alarm probability to generate an initial denoised signal. Thereafter, the noise removal method may apply a delay window to the initial denoised signal to generate an intermediate denoised signal. Finally, the noise removal method may perform a persistence check on the intermediate denoised signal to generate the final denoised signals, assuming a multiple component present in multiple CIRs when the transmitter or receiver moves in a small distance which is not true for the random noise. The false alarm probability, the delay window, and/or the persistence check may be dynamically optimized for a specific environment.

20 Claims, 16 Drawing Sheets

1500 ⟍

Determine that the one or more persistent MPCs are observed in a predetermined number of PDPs associated with a predetermined number of contiguous positions of the plurality of positions — 1510

Determine that the one or more persistent MPCs are observed at a predetermined number of contiguous delay bins associated with the predetermined number of contiguous positions — 1520

Filter the second set of de-noised PDPs based on the one or more persistent MPCs to generate at least one denoised signal — 1530

401 — User Plane

402 — Control Plane

1300

1400

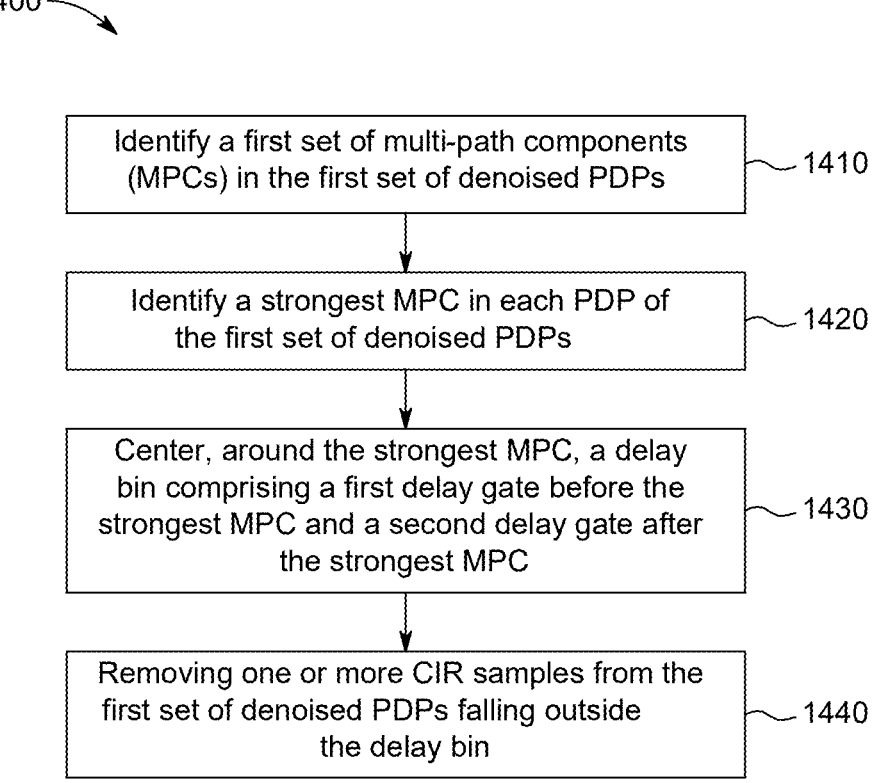

Identify a first set of multi-path components (MPCs) in the first set of denoised PDPs — 1410

Identify a strongest MPC in each PDP of the first set of denoised PDPs — 1420

Center, around the strongest MPC, a delay bin comprising a first delay gate before the strongest MPC and a second delay gate after the strongest MPC — 1430

Removing one or more CIR samples from the first set of denoised PDPs falling outside the delay bin — 1440

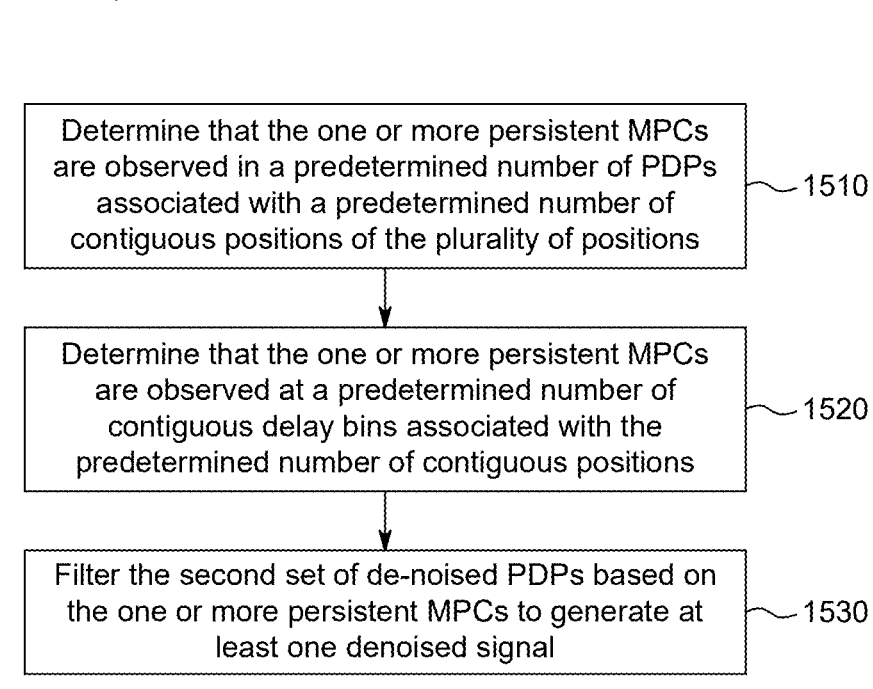

Determine that the one or more persistent MPCs are observed in a predetermined number of PDPs associated with a predetermined number of contiguous positions of the plurality of positions ⟋1510

Determine that the one or more persistent MPCs are observed at a predetermined number of contiguous delay bins associated with the predetermined number of contiguous positions ⟋1520

Filter the second set of de-noised PDPs based on the one or more persistent MPCs to generate at least one denoised signal ⟋1530

FIG. 15

WIRELESS CHANNEL MEASUREMENT NOISE REMOVING METHOD

CROSS REFERENCE TO RELATED APPLICATIONS

This application claims the benefit of U.S. 63/607,621 filed on Dec. 8, 2023, which is incorporated by reference as if fully set forth.

BACKGROUND

Wireless communication networks such as fixed wireless access (FWA) network are cost-effective and provide high user throughput. The FWA network may include one or more outdoor-to-indoor (O2I) propagation channels. The FWA may also include a hybrid network such as a broadband wireless connection between an outdoor antenna and indoor customer premises equipment (CPE). However, O2I propagation in the FWA network faces multiple challenges due to a high number of multi-path components (MPCs) and path losses because of various types of obstacles. Analyzing propagation channel characteristics is essential for radio link design and wireless network planning. Moving noise in the channel measurement data is a challenge in channel characterization. Noise removal is one of the key techniques in wireless channel estimation and modeling.

SUMMARY

In one or more embodiments of the present disclosure, an apparatus is provided. The apparatus includes a memory, a transceiver, and a processor. The transceiver comprises at least one antenna configured to receive a signal at a plurality of positions. The processor is configured to determine a plurality of channel impulse responses (CIRs) for the received signal at the plurality of positions. The processor is configured to determine a plurality of power delay profiles (PDPs) for the plurality of CIRs. The processor is configured to apply a dynamic noise threshold to the plurality of PDPs to generate a first set of denoised PDPs. The processor is configured to identify a first set of multi-path components (MPCs) in the first set of denoised PDPs. The processor is configured to apply at least one delay gate around one or more MPCs of the first set of MPCs to generate a second set of denoised PDPs. The processor is configured to identify one or more persistent MPCs from the second set of denoised PDPs. The transceiver and the processor are configured to filter the second set of denoised PDPs based on the one or more persistent MPCs to generate at least one denoised signal.

In an embodiment, the processor is further configured to determine a false alarm probability associated with the received signal at the plurality of positions. The processor is further configured to determine the dynamic noise threshold based on the false alarm probability.

In an embodiment, applying the dynamic noise threshold comprises determining a plurality of power levels of a plurality of CIR samples in each PDP of the plurality of PDPs. The processor compares the plurality of power levels with the dynamic noise threshold. The processor removes one or more CIR samples of the plurality of CIR samples having one or more power levels lesser than the dynamic noise threshold.

In an embodiment, the false alarm probability is a predetermined percentile within a noise distribution of the plurality of CIR samples.

In an embodiment, applying the at least one delay gate comprises identifying a strongest MPC in each PDP of the first set of denoised PDPs. The processor centers, around the strongest MPC, a delay bin comprising a first delay gate before the strongest MPC and a second delay gate after the strongest MPC. The processor removes one or more CIR samples from the first set of denoised PDPs falling outside the delay bin.

In an embodiment, identifying the one or more persistent MPCs comprises determining that the one or more persistent MPCs are observed in a predetermined number of PDPs associated with a predetermined number of contiguous positions of the plurality of positions.

In an embodiment, identifying the one or more persistent MPCs comprises determining that the one or more persistent MPCs are observed at a predetermined number of contiguous delay bins associated with the predetermined number of contiguous positions.

In an embodiment, the apparatus is a channel sounding apparatus.

In an embodiment, the at least one antenna is an antenna rotated through the plurality of positions along at least one of: a circumference of a circle, a line, or a curve.

In an embodiment, the at least one antenna is at least one of: an antenna array or a virtual circular array.

In one or more embodiments, a noise removing method is provided. The method includes receiving a signal by at least one antenna at a plurality of positions. The method includes determining a plurality of CIRs for the received signal at the plurality of positions. The method includes determining a plurality of PDPs for the plurality of CIRs. The method includes applying a dynamic noise threshold to the plurality of PDPs for generating a first set of denoised PDPs. The method includes identifying a first set of MPCs in the first set of denoised PDPs. The method includes applying at least one delay gate around one or more MPCs of the first set of MPCs to generate a second set of denoised PDPs. The method includes identifying one or more persistent MPCs from the second set of denoised PDPs. The method includes filtering the second set of denoised PDPs based on the one or more persistent MPCs for generating at least one denoised signal.

In an embodiment, the method is performed by a channel sounding apparatus.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 14 is a flowchart illustrating a process of noise removal by applying a delay bin according to one or more embodiments; and FIG. 15 is a flowchart illustrating a process of noise removal using a persistence check according to one or more embodiments.

DETAILED DESCRIPTION OF THE PREFERRED EMBODIMENTS

The underlying principle of a communication system is to enable one or more devices to communicate with one or more other devices. At a basic level, each device may need some basic components to operate. Any device referenced herein, including the hardware (e.g., virtual or physical) to run a function, software entity, application, or the like, may be understood to have at least one or more of the following components (e.g., where there may be one or more of each component): a processor, a transceiver (e.g., which may or may not be integrated with the processor), an input (e.g., microphone, keyboard, mouse, etc.), an output (e.g., port for outputting display signals, a display, a touch screen, a printer, etc.), a power source, a positioning chip (e.g., GPS, GLONASS, etc., which may or may not be integrated with the processor and/or transceiver), button (e.g., for controlling the specific function of one or more aspects of the device). These components may be operably connected to one another, meaning that there may be a direct connection or an indirect connection to one or more of the components.

A UE may be interchangeable with a station (STA), a mobile station, a fixed or mobile subscriber unit, a subscription-based unit, a pager, a cellular telephone, a personal digital assistant (PDA), a smartphone, a laptop, a netbook, a computer, a server, a functional entity (e.g., virtual and/or physical) a wireless sensor, a hotspot or Mi-Fi device, an Internet of Things (IoT) device, a watch or other wearable, a head-mounted display (HMD), a vehicle, a drone, or the like.

Figure 1:
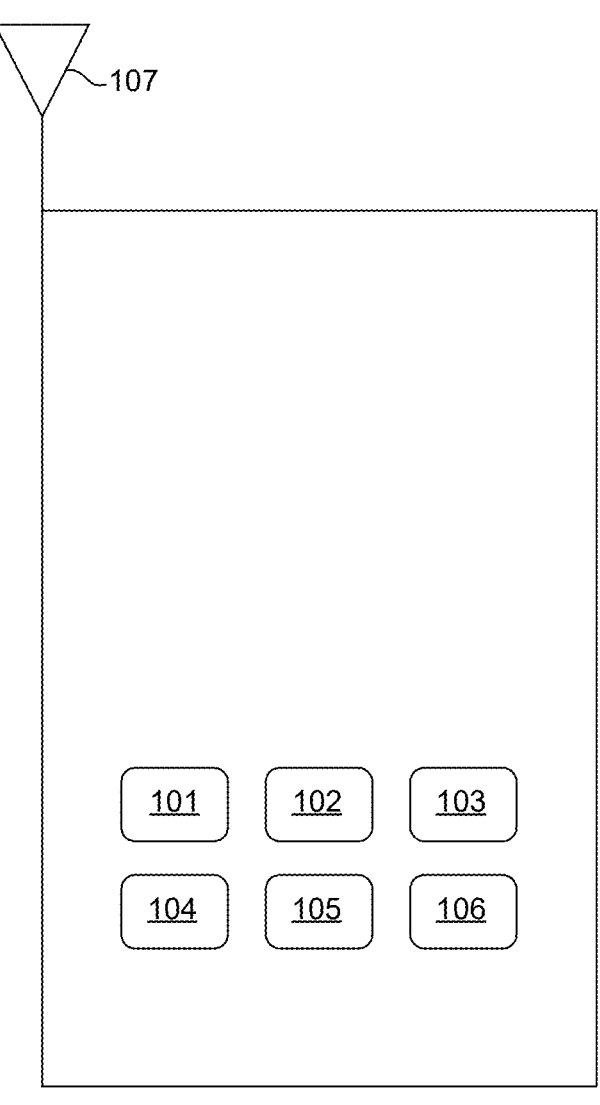
FIG. 1 is an illustration of an example device.

FIG. 1 is an illustration of an example device. In one case, the device may be a User Equipment (UE) suited for mobile operation. In this example, the UE may have a processor 101, a transceiver 102, a touchscreen 103, a power source 104 (e.g., a battery), a GPS 105, one or more other components 106 (e.g., as described herein), and/or an antenna 107.

Generally, a processor may be any kind of processor, such as a processor capable of carrying out one or more of the techniques described herein. A transceiver may be configured to transmit and receive signals. In one case, there may be a separate receiver and transmitter. A transceiver may be connected to one or more antennas (e.g., MIMO technology). A transceiver may be configured to transmit RF signals. In one case, a transceiver may be configured to transmit light signals (e.g., IR, UV, laser, etc.). A transceiver may be configured to send/receive more than one type of RF signal (e.g., different radio access technologies for one transceiver, or multiple transceivers each dedicated to a specific radio access technology). A transceiver may be configured to modulate signals for transmission and demodulate signals for reception. The UE may be capable of full duplex operation, where there is transmission and reception of some or all signals may be concurrent and/or simultaneous (e.g., different timing/spacing for UL or DL).

Different radio access technologies may be used with one or more transceivers (e.g., 802.11, WCDMA, CDMA2000, GSM, LTE, LTE-A, LTE-A Pro, NR, etc.)

Figure 2:
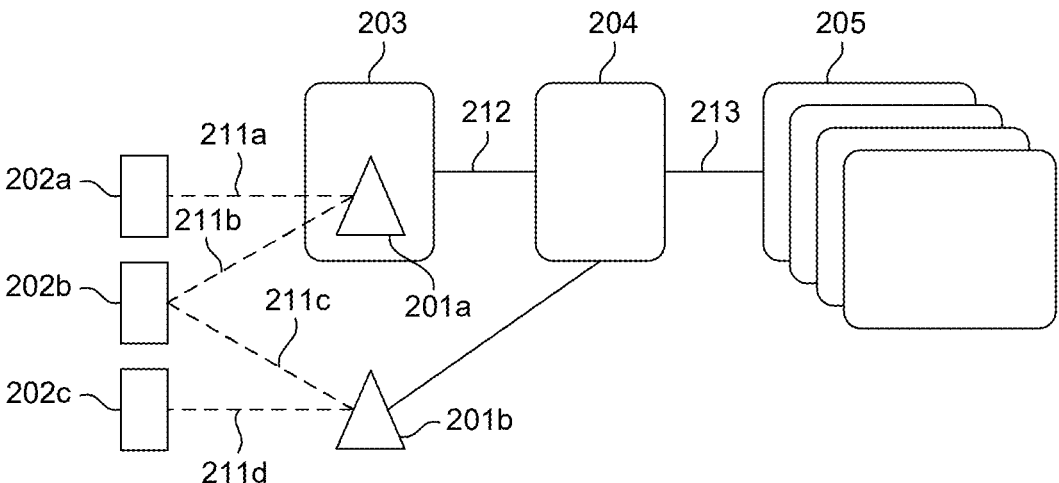
FIG. 2 illustrates an example communication system.

FIG. 2 illustrates an example communication system. This example may be used to illustrate multiple wireless protocols. For all wireless protocols, there may be mobile or stationary devices (e.g., 202a, 202b, 202c, such as a UE) that connect to a base station device 201a and/or 201b. In one case, this may enable a mobile device to connect to a service (e.g., a remote server) or data network (e.g., internet).

In one case, the base stations (201a, 201b) may be equivalent to, and/or interchangeable with, a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, transmission receive point (TRP), network (NW), RP (reception point), RRH (radio remote head), DA (distributed antenna), BS (base station), a sector (of a BS), and a cell (e.g., a geographical cell area served by a BS). Each base station may be representative of more than one base station (e.g., multiple transmission reception points).

Generally, a communication system may use a combination of wired and wireless connections at different points in the system. One or more wireless technologies may (e.g., channel access methods), may include code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

A base station may be configured to transmit and/or receive wireless signals on one or more carrier frequencies, which may be referred to as a cell (not shown). A base station (201a, 201b) may communicate with one or more UEs (202a, 202b, 202c) over an air interface (211a, 211b, 211c, 211d).

In one case, one or more base stations may implement LTE radio access and NR radio access together, for instance using dual connectivity (DC) approach. Therefore, the system (e.g., and perhaps one or more UEs) may implement multiple types of radio access technologies that use more than one type of base station (e.g., an eNB and a gNB).

In one case, the communication system may include a radio access network (RAN) 203, a core network 206, and one or more other elements represented by 205 (e.g., public switched telephone network (PSTN), the Internet, and other networks or the like).

In one scenario using FIG. 2 as an illustration, a RAN 203 may be in communication with a CN 204. The base station 201*a* may be an eNB, and the access technology may be based on E-UTRA (e.g., LTE, etc.). The communication system may handle data transmission from the UE 202*a*. The data may have varying quality of service (QoS) requirements, such as differing throughput requirements, latency requirements, error tolerance requirements, reliability requirements, data throughput requirements, mobility requirements, and the like. The CN 204 may provide call control, billing services, mobile location-based services, pre-paid calling, Internet connectivity, video distribution, etc., and/or perform high-level security functions, such as user authentication. Although not shown, the RAN 203 and/or the CN 204 may be in direct or indirect communication with other RANs that employ the same RAT as the RAN 203 or a different RAT. For example, in addition to being connected to the RAN 203, which may be utilizing a NR radio access technology, the CN 204 may also be in communication with another RAN (not shown) employing another radio access technology (e.g., E-UTRA, WiFi, etc.). Each of the eNBs may be associated with a particular cell (not shown) and may be configured to handle radio resource management decisions, handover decisions, scheduling of users in the UL and/or DL, and the like. Each eNB may communicate with one another over an X2 interface (not shown).

In one scenario using FIG. 2 as an illustration, the RAN 203 and the CN 204 may employ NR radio access technologies and related protocols. The base station may be a gNB 201. The gNB(s) may implement carrier aggregation technology, where multiple component carriers may be transmitted to the UE 202*a*. A subset of these component carriers may be on unlicensed spectrum while the remaining component carriers may be on licensed spectrum. The UE(s) may communicate with the gNB(s) using transmissions associated with a scalable numerology (e.g., subcarrier spacing, etc.). For example, the OFDM symbol spacing and/or OFDM subcarrier spacing may vary for different transmissions, different cells, and/or different portions of the wireless transmission spectrum. The UE(s) may communicate with gNB(s) using subframe or transmission time intervals (TTIs) of various or scalable lengths (e.g., containing a varying number of OFDM symbols and/or lasting varying lengths of absolute time). The gNB(s) may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF), routing of control plane information towards Access and Mobility Management Function (AMF), and the like. The gNB(s) may communicate with one another over an Xn interface.

Not shown (e.g., but still possibly part of one or more example scenarios described herein), the CN may include one or more AMF, one or more UPF, one or more Session Management Function (SMF), and/or one or more Data Networks (DNs). In one case, the aforementioned elements may be owned and/or operated by an entity other than the CN operator.

In one scenario using FIG. 2 as an illustration, an Internet 205 may include a global system of interconnected computer networks and devices that use common communication protocols, such as the transmission control protocol (TCP), user datagram protocol (UDP) and/or the internet protocol (IP) in the TCP/IP internet protocol suite.

Figure 3:
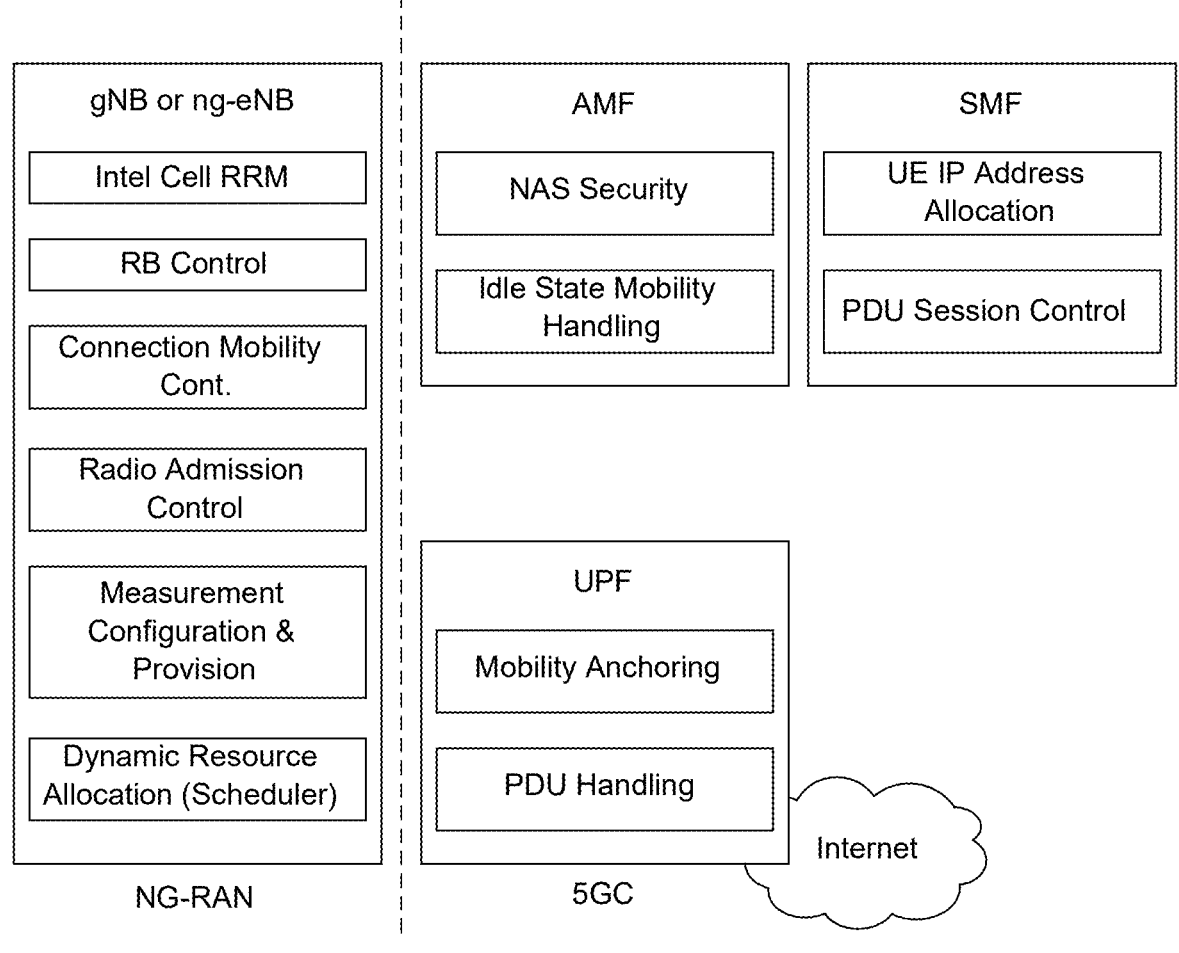
FIG. 3 illustrates an example of a functional split between a next generation radio access network (NG-RAN) and 5G core (5GC)

FIG. 3 illustrates an example of a functional split between the NG-RAN and 5GC. The AMF may be connected to one or more gNB the RAN via an N2 interface and may serve as a control node. For example, the AMF may be responsible for authenticating a UE's support for network slicing (e.g., handling of different protocol data unit (PDU) sessions with different requirements), selecting a particular SMF, management of the registration area, termination of non-access stratum (NAS) signaling, mobility management, and the like. Network slicing may be used by the AMF in order to customize CN support for one or more UEs based on the types of services being utilized by the respective UE. For example, different network slices may be established for different use cases such as services relying on ultra-reliable low latency (URLLC) access, services relying on enhanced massive mobile broadband (eMBB) access, services for MTC access, and the like. The AMF may provide a control plane function for switching between the RAN and other RANs that employ other radio technologies (e.g., as described herein). The SMF may be connected to an AMF in the CN via an N11 interface. The SMF may also be connected to a UPF in the CN via an N4 interface. The SMF may select and control the UPF and configure the routing of traffic through the UPF. The SMF may perform other functions, such as managing and allocating UE IP address, managing PDU sessions, controlling policy enforcement and QoS, providing DL data notifications, and the like. A PDU session type may be IP-based, non-IP based, Ethernet-based, and the like. The UPF may be connected to one or more gNB in the RAN via an N3 interface, which may provide a UE with access to packet-switched networks, such as the Internet, to facilitate communications between one or more UEs and IP-enabled devices. The UPF may perform other functions, such as routing and forwarding packets, enforcing user plane policies, supporting multi-homed PDU sessions, handling user plane QoS, buffering DL packets, providing mobility anchoring, and the like. The CN may facilitate communications with other networks. For example, the CN may provide a UE with access to the other networks 212, which may include other wired and/or wireless networks that are owned and/or operated by other service providers. In one example, the UEs may be connected to a local DN through a UPF via an N3 interface to the UPF and an N6 interface between the UPF and the DN. As discussed herein, a NR RAN may be called an NG-RAN and a NR CN may be called a 5GC.

Figure 4:
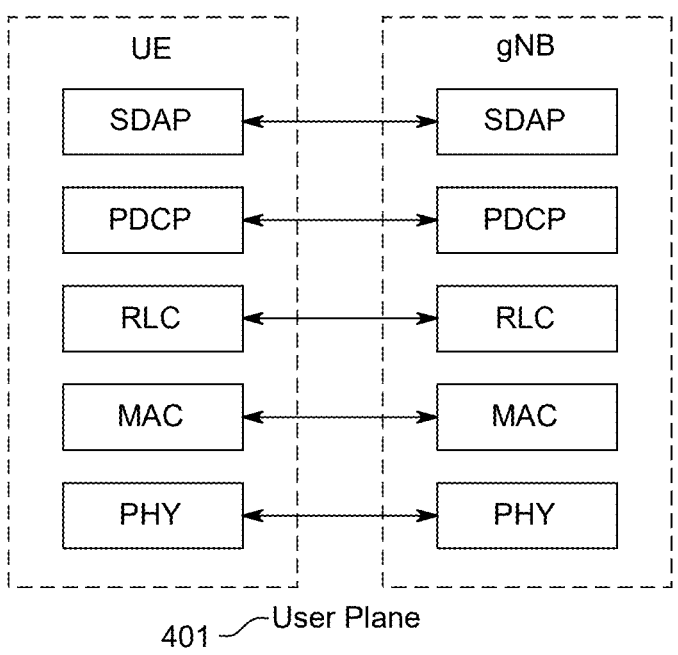
FIG. 4 illustrates an example of a protocol stack for a user plane and a control plane.
Figure 4:
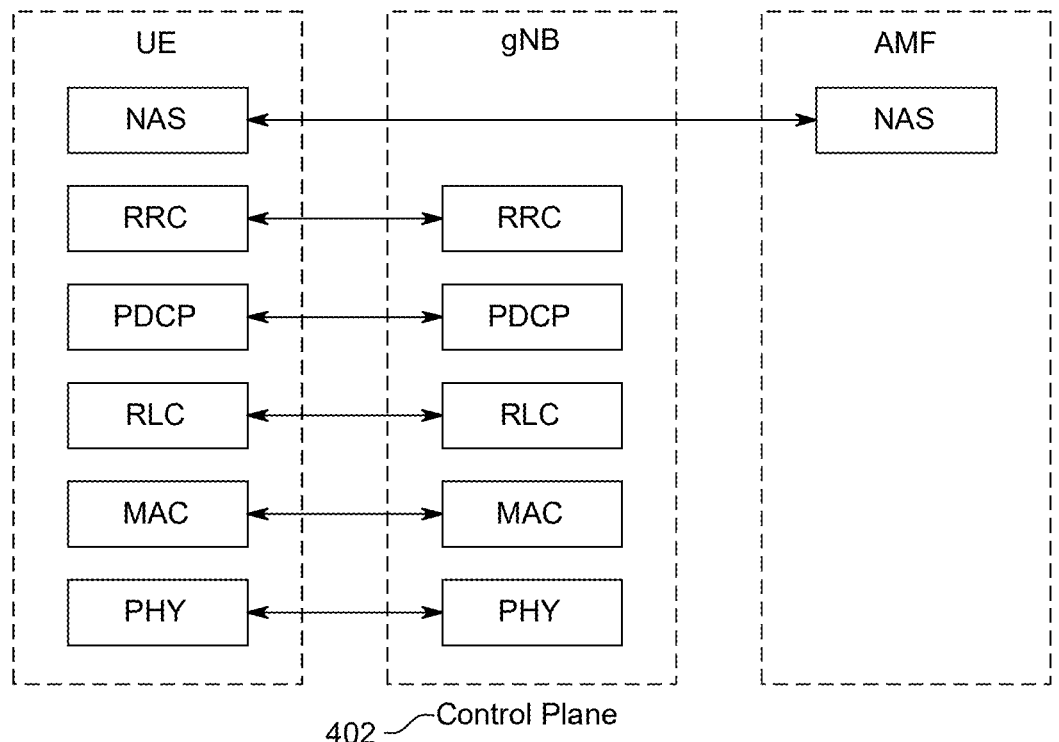

FIG. 4 illustrates an example of a protocol stack for the user plane and control plane. The user plane protocol stack 401 and the control plane stack 402. A higher layer may refer to one or more layers in a protocol stack, or a specific sublayer within the protocol stack. The protocol stack may comprise of one or more layers in a UE or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

The present disclosure may be implemented in a fixed wireless access (FWA) network including communication in one or more propagation channels. In one or more embodiments of the present disclosure, multiple channel impulse responses (CIRs) and/or their magnitude square version power delay profiles (PDPs) may be used for propagation channel measurement and/or modeling. The CIRs are in a time domain and may be converted to corresponding channel transfer functions (CTFs) in a frequency domain via a Fourier transform. The CTFs may be used to determine the radio propagation channel characteristics in the frequency domain. The frequency domain properties of the propagation channel may be analyzed based on the CTFs. The CTFs may have multiple deep fades and/or small peaks due to destructive and/or constructive interferences. Measured data for both the CIRs (and/or the PDPs) in the time domain and the CTFs in the frequency domain may include noise, which limits a dynamic range and a minimum measurable signal strength. Properly removing noise from the CIRs and/or the CTFs extends the dynamic range in channel measurement.

Modern communication technologies such as 5G NR, LTE, and/or Wi-Fi, etc. use OFDM to divide the channel into smaller sub-carriers that mitigate frequency-selective fading. However, using the OFDM in the channel presents multiple challenges. In that, the OFDM implementation is less efficient, a larger number of reference sub-carriers are required to sufficiently estimate the channel, and the channel has a fluctuating signal to noise ratio (SNR), etc.

Figure 5A:
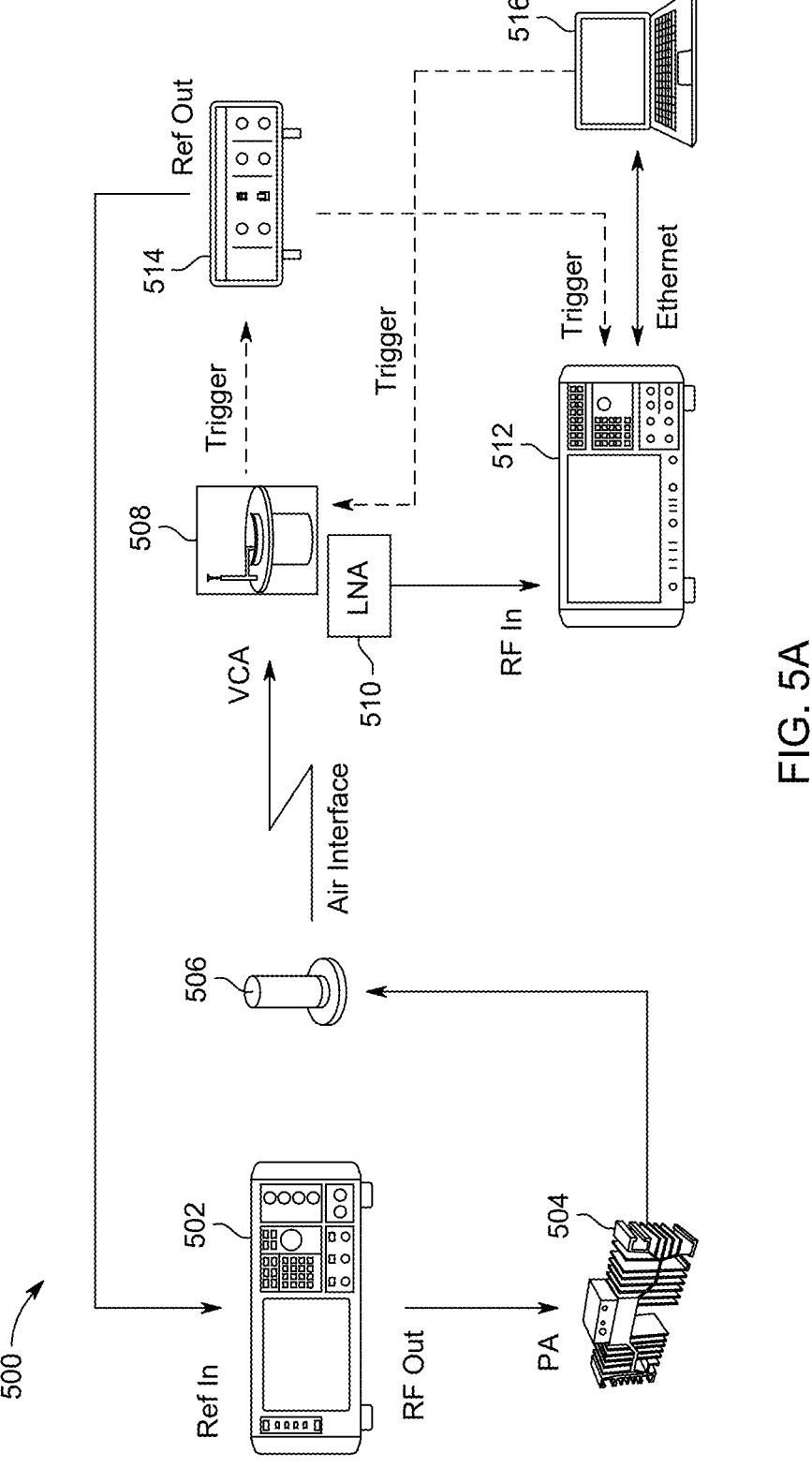
FIG. 5A illustrates a schematic block diagram of an example channel sounder setup according to one or more embodiments.

Referring now to FIG. 5A, a schematic block diagram of an example channel sounder setup 500 is illustrated according to one or more embodiments. The channel sounder setup 500 includes a vector signal generator (VSG) 502, a power amplifier (PA) 504, a single transmit antenna 506, a virtual circular array (VCA) antenna 508, a low noise amplifier (LNA) 510, a signal and spectrum analyzer 512, a time reference (e.g., Synchronomat) 514, and a computer 516. In an embodiment, the channel sounder is provided to perform one or more measurements of a signal received through the channel. The channel sounder may include a transmitter and a receiver. The transmitter may comprise the VSG 502 for generating a periodic correlation sequence. The sequence may be modulated onto one or more carrier frequencies, amplified by the PA 504, and transmitted through the omnidirectional antenna 506 to the channel sounder.

The receiver may receive the sequence. The channel sounder may include an omnidirectional receiving antenna. During sampling, the antenna may be mechanically moved in multiple positions on the circumference of a circle. The antenna may function as a virtual circular array (i.e. the VCA 508). The received signal may be correlated with the original sequence. The received signal may be amplified by the LNA 510. The channel sounder may generate one channel impulse response (CIR) for each antenna position on the circumference. The sampling may be performed coherently with a timing and triggering device (i.e. the time reference 514). The time reference 514 may be used in synchronizing the transmitter and the receiver. The time reference 514 may provide a reference signal (e.g., a 10 MHz reference signal) generated by an oscillator (e.g., a Rubidium oscillator). In addition to the CIR, the channel sounder may derive phase information between one or more VCA elements and an absolute time of flight (ToF) for each VCA element based on the measured samples. The computer 516 may perform one or more noise removal processes on the received signal to generate one or more denoised signals.

In an embodiment, noise in a delay domain may impact amplitude fluctuation in the frequency domain CTF. Therefore, removing noise is critical for frequency domain analysis. Noise removal may be especially important for weak indoor channels undergoing rich scattering. Hence, a noise threshold is pushed as low as possible to support and/or analyze many multiple path components (MPCs).

The present disclosure provides a method for noise removal. Initially, the method may apply a dynamic noise threshold based on a false-alarm probability to generate an initial denoised signal comprising a first set of denoised PDPs. Thereafter, the method may apply a delay window to the first set of denoised PDPs of the initial denoised signal to generate an intermediate denoised signal comprising a second set of denoised PDPs. Thereafter, the method may perform a persistence check on the second set of denoised PDPs of the intermediate denoised signal to generate at least one final denoised signal. The false alarm probability, the delay window, and/or the persistence check may be dynamically optimized for a specific environment.

The noise removal method of the present disclosure removes noise in the time domain, and saves the MPCs. The present noise removal method may be optimized based on one or more characteristics of the radio propagation channel.

Figure 5B:
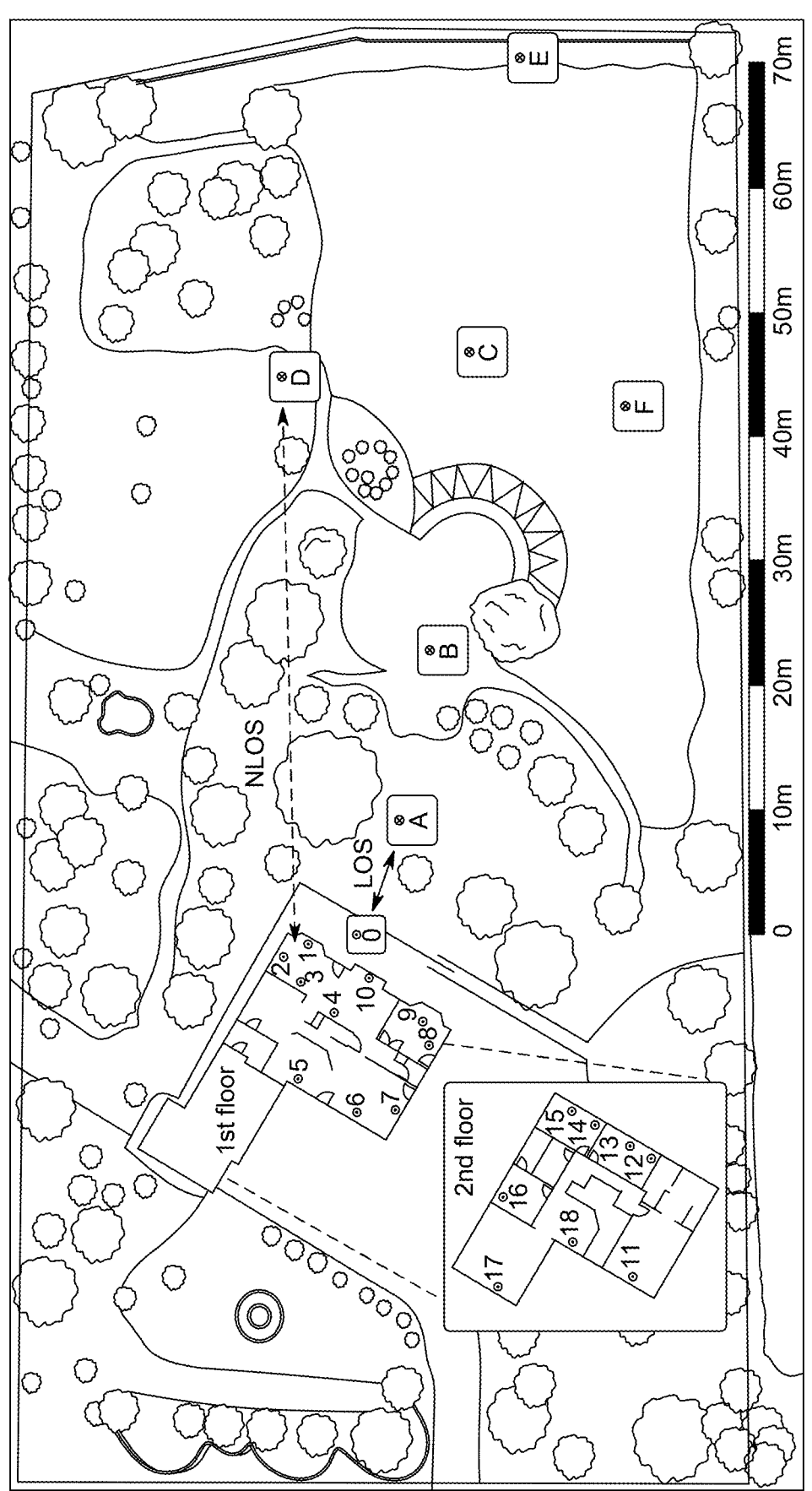
FIG. 5B illustrates a map of an example setup of multiple transmitters and receivers in multiple outdoor and indoor positions according to one or more embodiments.

Referring now to FIG. 5B, a map of an example setup of multiple transmitters and receivers in multiple outdoor and indoor positions is shown according to one or more embodiments. In the example setup, a plurality of outdoor transmitters are positioned at positions A through F, an outdoor receiver is positioned at position 0, and a plurality of indoor receivers are positioned at positions 1 through 18 on the first floor and the second floor of a building. The plurality of transmitters and the plurality of receivers (including outdoor and indoor receivers) are in communication by way of FWA propagation channels. In an example, the outdoor receiver at position 0 is in the line of sight (LOS) of one or more transmitters and the indoor receivers are in non-LoS (NLOS) of the plurality of transmitters. In an example, the example setup includes 216 O2I links and 12 outdoor-to-outdoor links for 6 and 37 GHz.

The channel frequency response H[f] is modeled as $$H[f] = \sum_{k=1}^{K} \alpha(f_k) e^{-j\theta(f_k)} \qquad \text{equation (1)}$$

where K is the number of samples in the frequency domain (frequency bins),
$\alpha(f_k)$ is the amplitude, and
$\theta(f_k)$ is phase of a complex channel gain at frequency $f_k$.

A multipath propagation environment in the channel may cause an amplitude fluctuation in a frequency domain, which may introduce frequency-selective fading depending on a considered bandwidth. In OFDM, a total bandwidth is divided into multiple smaller bandwidths. In that, a center of each small bandwidth may serve as a subcarrier frequency. The channel may be partitioned with an aim of converting a frequency-selective channel into multiple frequency flat sub-channels. Typically, 5G NR uses 60 kHz subcarrier spacing in the 6 GHz bands and 120 kHz SCS in the 37 GHz bands.

In an example, a 500 MHz measurement bandwidth may be divided into smaller bandwidths of 60 kHz at 6 GHz and into smaller bandwidths of 120 kHz at 37 GHz similar to 5G NR. In an example, a channel sounding bandwidth may be 500 MHz with a frequency resolution of 2 kHz and K=250,000 samples in the frequency domain. The channel may be measured in a delay domain, thus one or more CIRs may be converted to the CTFs via fast Fourier transform (FFT). Each CTF (1000 antennas×250,000 samples) representing a single link may be normalized so that each antenna receives a total power of 0 dB on average. Hence, every link may have a total power of 30 dB after power normalization. The normalization may account for power variation introduced due to the path loss and/or large scale fading. The fading caused by frequency selectivity may be analyzed. Following normalization, both the amplitude (power) flatness inside a sub-carrier (within 30 or 60 samples) and power variation across the sub-carriers may be analyzed.

In an embodiment, the dynamic noise threshold based on the false-alarm probability may be applied to generate the initial denoised signal. Thereafter, the delay window may be applied to the initial denoised signal to generate the intermediate denoised signal. Thereafter, the persistence check may be performed on the intermediate denoised signal to generate the final denoised signal. The false alarm probability, the delay window, and/or the persistence check may be dynamically optimized for the O2I environment between the plurality of transmitters and the plurality of indoor/outdoor receivers on the first floor and the second floor.

In an example, the channel may be observed for a predetermined duration. In that, one or more relevant MPCs may be observed within hundreds of ns or a few μs, for example. One or more long CIR tails, which do not include MPCs may be used to determine one or more noise statistics for each link. In an example, a maximum noise power may be from −145 dB up to −138 dB. In this case, a noise threshold may be set as a 99.99th percentile noise power instead of the maximum noise power to extract one or more MPCs weaker than the maximum noise power. In an example, such thresholding may allow 0.01% of the noise samples to pass while also retaining one or more weaker MPCs. Thereafter, one or more false alarm noise samples may be filtered and/or removed by the noise removal method using the delay gate and the persistence check.

Further, a delay spread in the O2I propagation channel may be in an order of a few μs. In the delay gating method of noise removal (i.e. denoising), for each CIR, a delay bin having a first delay gate of a first duration before the strongest MPC and a second delay gate of a second duration after the strongest MPC may be applied. One or more CIR samples above the dynamic noise threshold that fall outside of the delay bin may be likely to be noise and hence may be removed.

Thereafter, a persistence check may be performed. Typically, a typical MPC is persistently present in multiple CIRs collected on adjacent VCA positions. If a CIR sample that passes the first two noise removal processes is only present once within a predetermined threshold number of contiguous CIRs and/or a predetermined threshold number of delay bins, the CIR sample may be considered noise and removed.

Figure 6:
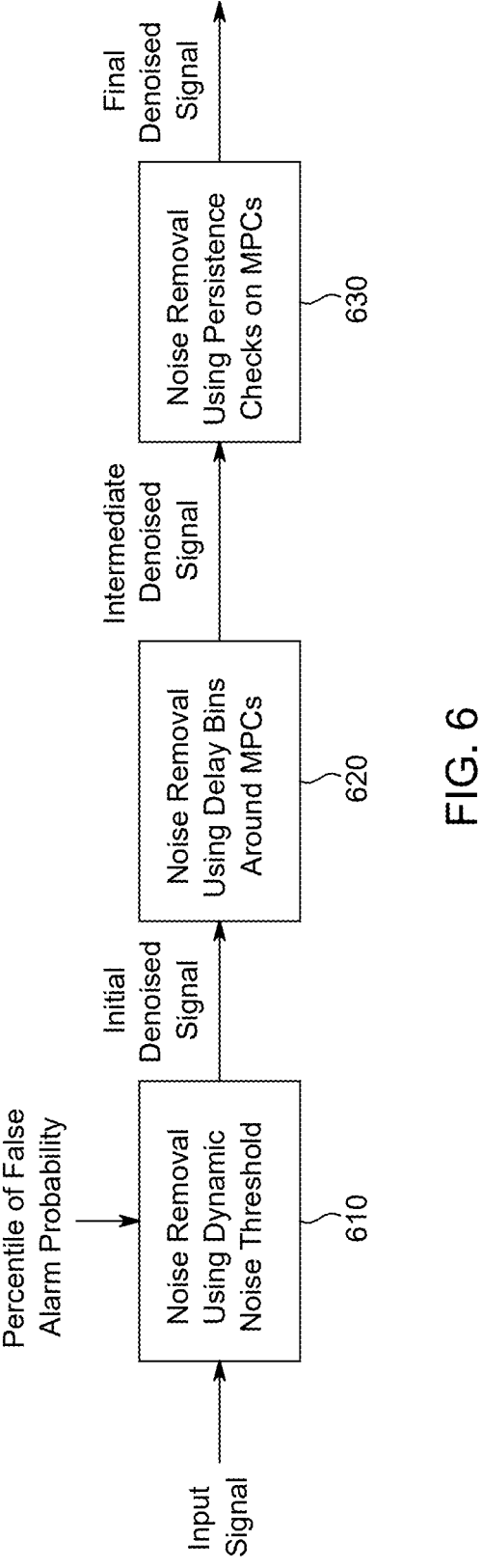
FIG. 6 illustrates a flow diagram of an example process of noise removal according to one or more embodiments.

Referring now to FIG. 6, a flow diagram of an example process of noise removal is shown according to one or more embodiments. The process may include a first stage 610 of noise removal using the false alarm probability and/or the dynamic noise threshold, a second stage 620 of noise removal using one or more delay bins around one or more MPCs, and a third stage 630 of noise removal using the persistence check on the one or more MPCs.

Initially, the PDP of the received signal (e.g. an input signal) is determined. At the transmitter, a transmitter antenna may be an omnidirectional antenna mounted on a VCA, rotating 2 circles per second. At the receiver, a plurality of PDPs (e.g., 1000 PDPs) may be measured on the circle. The receiver may determine a PDP for each position of the plurality of positions of the transmitter antenna. The receiver may also determine the corresponding CTF in the frequency domain.

Noise removal may be performed using various noise thresholds. For instance, noise may be removed based on an average noise power. However, using the average noise power likely underestimates the noise and allows too many noise samples to remain in the data after applying the noise threshold. Therefore, the noise threshold should not be too low.

In another example, a maximum noise power may be used. Using the maximum noise power may overestimate the noise and remove all the noise samples. However, it also removes many useful MPCs in the PDPs that are below the noise threshold (i.e. the maximum noise power). Therefore, the noise threshold should not be too high.

In an embodiment, a dynamic noise threshold may be used. The dynamic noise threshold may be 1−X (e.g., 99.99%) percentile noise power with the false alarm probability X % (e.g., 0.01%). The false alarm probability of X % may be optimized to remove noise while saving the useful MPCs. In an example, 10 dB margin above the average noise power may be used as the noise threshold.

At 610, the PDP is denoised based on the dynamic noise threshold to generate an initial denoised signal. For a false alarm probability of 0.01%, the dynamic noise threshold is 99.99 percentile noise level. In an example, a bigger false alarm probability allows more MPCs, and hence, increases the dynamic range. The maximum noise power, in this example, is −141.55 dBm, and the minimum noise power, in this example, is −232.64 dBm. The 99.99 percentile noise level is the noise power of −145.18 dBm. In this example, the dynamic noise threshold is 9.66 dB higher than the average threshold. The dynamic noise threshold, X, is optimized as 0.01. In that, the noise threshold reduces from −141.55 dBm (based on the maximum noise power) to −145.18 dB, thereby improving the dynamic range by 3.63 dB.

The dynamic range is determined as a difference between the peak power and the minimum detectable power. Using the average method, there are 0 CIRs that have a dynamic range of less than or equal to 30 dB. Using the false alarm method, there are 170 CIRs that have a dynamic range of less than or equal to 30 dB. Using the margin method, there are 187 CIRs that have a dynamic range of less than or equal to 30 dB.

At 620, the initial denoised signal generated at 610 is further denoised using one or more delay gates to generate the intermediate denoised signal.

At 620, the method determines an index of a peak in each PDP of the first set of denoised PDPs of the initial denoised signal. The method shifts the peak so that the peak appears at delay zero. The method applies a delay bin Y symmetrically around the peak (i.e., 15 µs delay gate before the peak and 15 µs delay gate after the peak). The symmetry of the delay gate facilitates maintaining the side lobes, easier to manipulate since this is equivalent to symmetric zero padding. The method removes the CIR samples that fall outside the delay bin, and hence, reduces a matrix size to 1000× 15001 in an example. The method performs FFT after the zero padding to the original size. The delay bin, Y, may be optimized as 667 ns (200 m) before the peak and 6.67 µs after the peak which corresponds to 2 km. That is, in an example, any signals that propagate over 2 km longer than the strongest signal may be removed.

At 630, the noise removal method performs the persistence check on the second set of denoised PDPs of the intermediate denoised signal to generate a final denoised signal. In an example, high delay (positive or negative) MPCs make a coherence bandwidth smaller causing fast fluctuation in the frequency domain.

$$h(t) = \sum a\_k * \delta(t - \mathrm{T}\_k) \qquad \text{equation (2)}$$

$$H(j\omega) = \sum a\_k * e^\wedge(-j\omega \mathrm{T}\_k) = \qquad \text{equation (3)}$$

$$e^\wedge(-j\omega \mathrm{T}\_0) * \sum a\_k^\wedge e(-j\omega(\mathrm{T}\_k - T0))$$

In this case, τ_0 is zero since the peak is shifted to delay zero. Hence, the fastest varying sinusoid corresponds to the highest delay point as there is an inverse relation between coherence bandwidth and delay spread. True MPCs persist across delay and time (i.e. antenna number domain). The method checks for persistence across a predetermined number (e.g., 10) of neighboring antenna bins and a predetermined number (e.g., 6) of neighboring delay bins (e.g., 11×7 to center current point). The method processes the delay gated matrix of size 1000×15001, adds a zero pad of size 3 (i.e., (7-1)/2) column wise so each value rests on the center of the filter, and adds a circular symmetry of size 5 (i.e. (11-1)/2) to centralize and consider neighbors. The method adds the bottom 5 antennas to the top (i.e. 996-1000). For instance, for antenna 1, antenna 1000 is a valid neighbor. The method adds the top 5 antennas to the bottom (i.e., 1-5). For instance, for antenna 1000, antenna 1 is a valid neighbor. In this example, the MPCs with any neighbor within a persistence window (11×7) are considered valid. Once delay domain validation checks are done, the method zero pads to the original size (15,001 to 250,000) and then performs FFT. In the example illustrated in FIGS. 7-10, before the persistence check, there are 123715 valid points. After the persistence check, there are 122444 valid points and 1271 invalid points.

In operation, in this example, the dynamic noise threshold X is optimized as 0.01 which allows 0.01% of noise samples above the noise threshold. This reduces the noise threshold from −141.55 dBm to −145.18 dB and improves the dynamic range by 3.63 dB. The delay bin Y is optimized as 200 ns before the peak and 6.67 µs after the peak which corresponds to 2 km. Any signals that propagate over 2 km longer than the strongest signal are unreasonable and are removed. The persistence in the delay domain P and the persistence in the frequency domain Q are optimized to 5 antenna positions before and 5 antenna positions after the current antenna position.

In an example, the initial denoised signal, the intermediate denoised signal, and/or the final denoised signal may refer to one or more signals with improved signal to noise ratios. In an example, the initial denoised signal, the intermediate denoised signal, and/or the final denoised signal may refer to one or more signals obtained by removing one or more noise samples and/or undesired components from the input signal.

FIGS. 7-12 illustrate various graphs of one or more signals described in FIG. 6.

Figure 7:
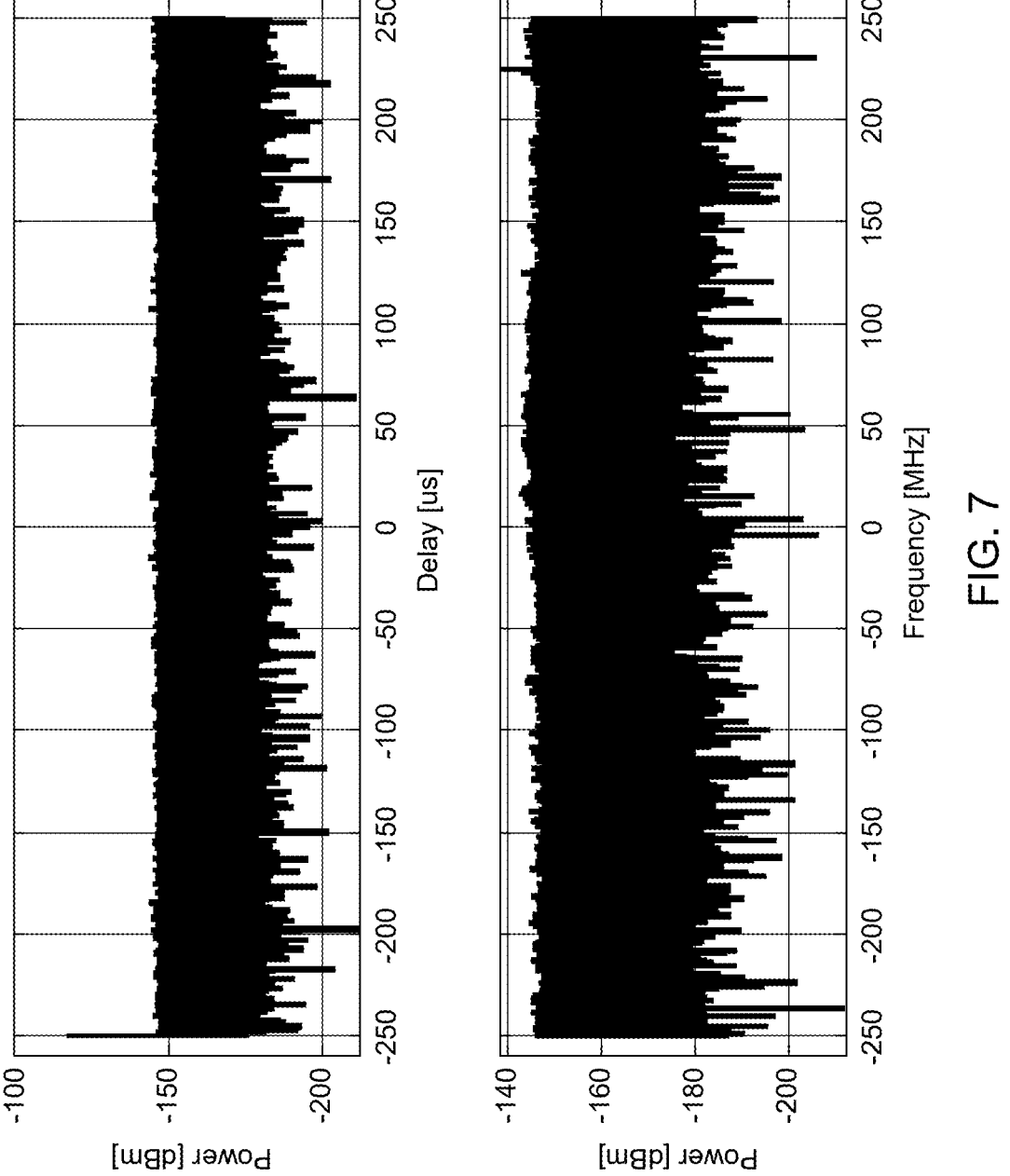
FIG. 7 illustrates an example power delay profile (PDP, power versus delay) and channel transfer function (CTF, power versus frequency) before applying the noise removal method in an outdoor-to-indoor (O2I) environment according to one or more embodiments.

FIG. 7 illustrates an example signal in the O2I environment according to one or more embodiments. In an example, FIG. 7 illustrates the input signal of FIG. 6. In that, FIG. 7 illustrates 500 MHz bandwidth from 5.925 to 6.425 GHz in the O2I environment, for NLOS transmitters and receivers. In an example, the delay resolution is 2 ns, the PDP length is 500 microseconds, 250,000 samples. A transfer function from a single physical test position (50 total positions) is illustrated. The transmitter antenna is the omnidirectional antenna mounted on a VCA, rotating 2 circles per second. At the receiver, the plurality of PDPs (e.g., 1000 PDPs) are measured on the circle. FIG. 7 illustrates an example of an individual PDP at one position of the plurality of positions of the transmitter antenna. FIG. 7 also illustrates the corresponding CTF in the frequency domain.

Figure 8:
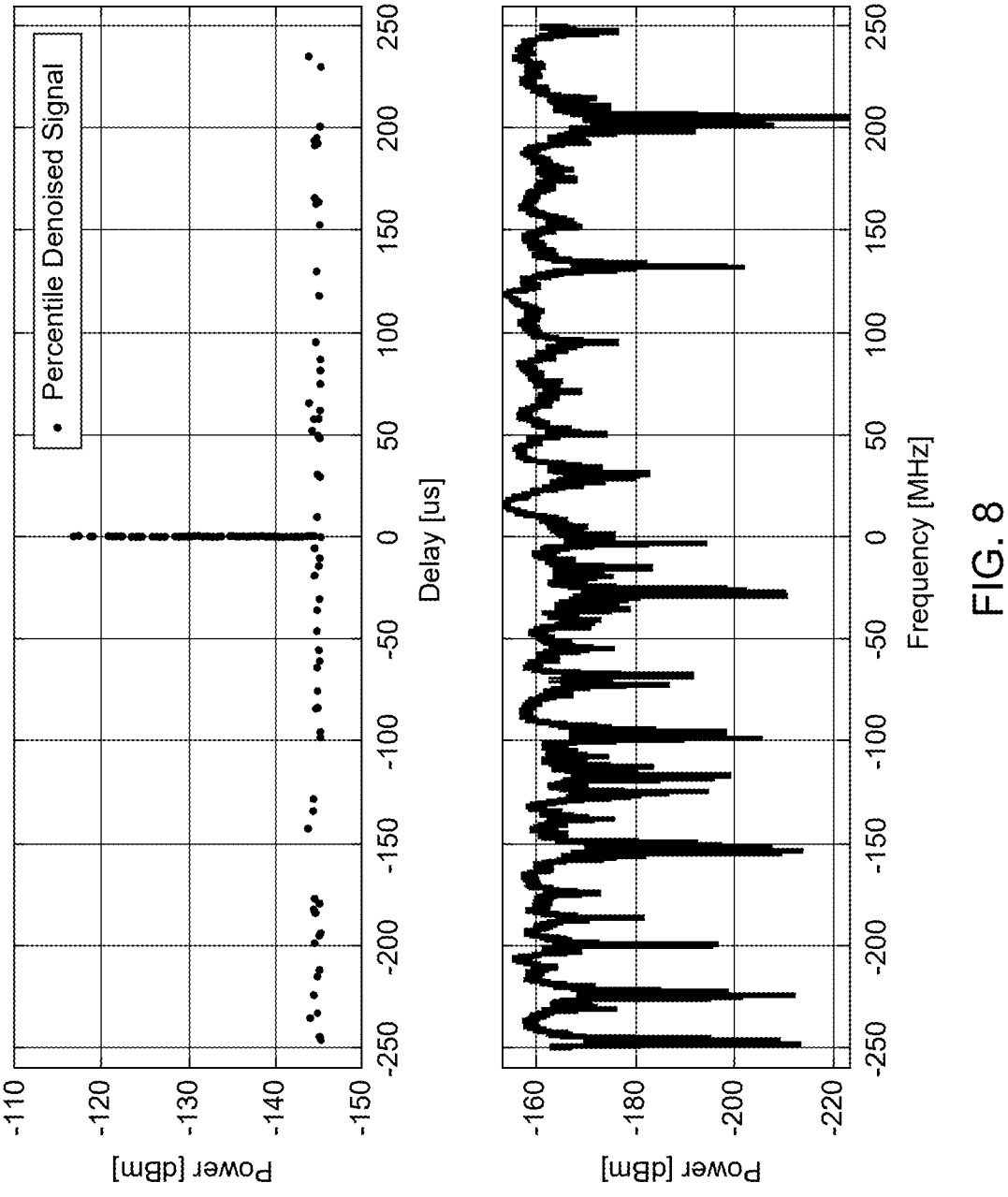
FIG. 8 illustrates a denoised PDP and CTF using a dynamic noise threshold according to one or more embodiments.

FIG. 8 illustrates the PDP denoised using the dynamic noise threshold according to one or more embodiments. In an example, FIG. 8 illustrates the initial denoised signal of FIG. 6. In that, the initial denoised signal is generated based on the dynamic noise threshold. For the false alarm probability of 0.01%, the dynamic noise threshold is 99.99 percentile noise level. In an example, a bigger false alarm probability allows more MPCs, and hence, increases the dynamic range. As illustrated in FIG. 8, the maximum noise power, in this example, is −141.55 dBm and the minimum noise power, in this example, is −232.64 dBm.

Figure 9:
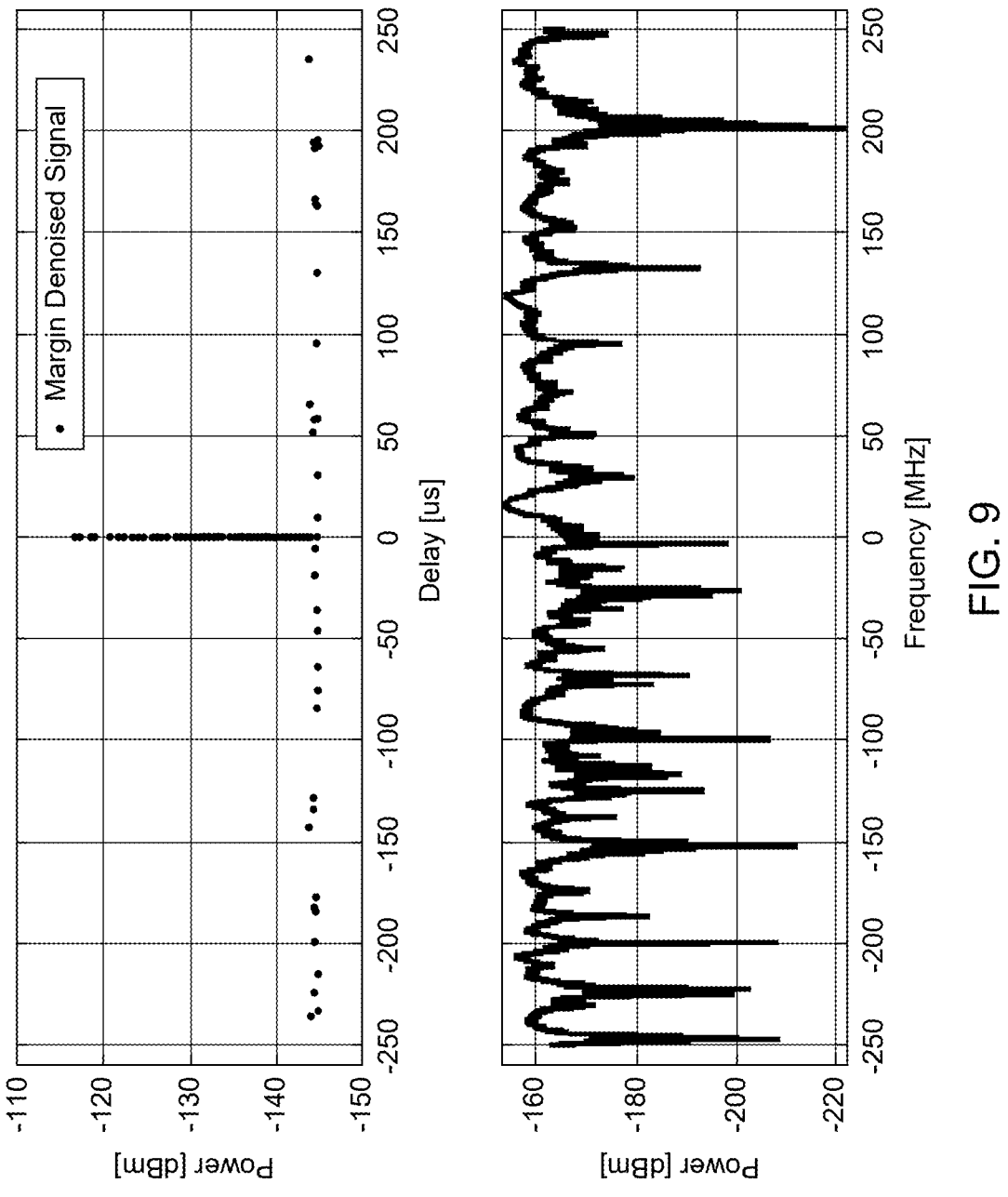
FIG. 9 illustrates a denoised PDP and CTF using a dynamic noise threshold at a predetermined level above an average noise power according to one or more embodiments.

FIG. 9 illustrates the denoised PDP using the dynamic noise threshold at a predetermined level above an average noise power according to one or more embodiments. FIG. 9 illustrates the denoised PDP based on the dynamic noise threshold that is 10 dB above the average noise power. Here, the noise removal method derives ~0.005% probability of including noise as the MPC. The noise is additive white Gaussian noise (AWGN) that follows a Rayleigh distribution. FIG. 9 illustrates a 30 dB MPC threshold from the peak. The 99.99 percentile noise power is 9.66 dBm above the average noise power. The maximum noise power is 13.34 dBm above the average noise power.

Figure 10:
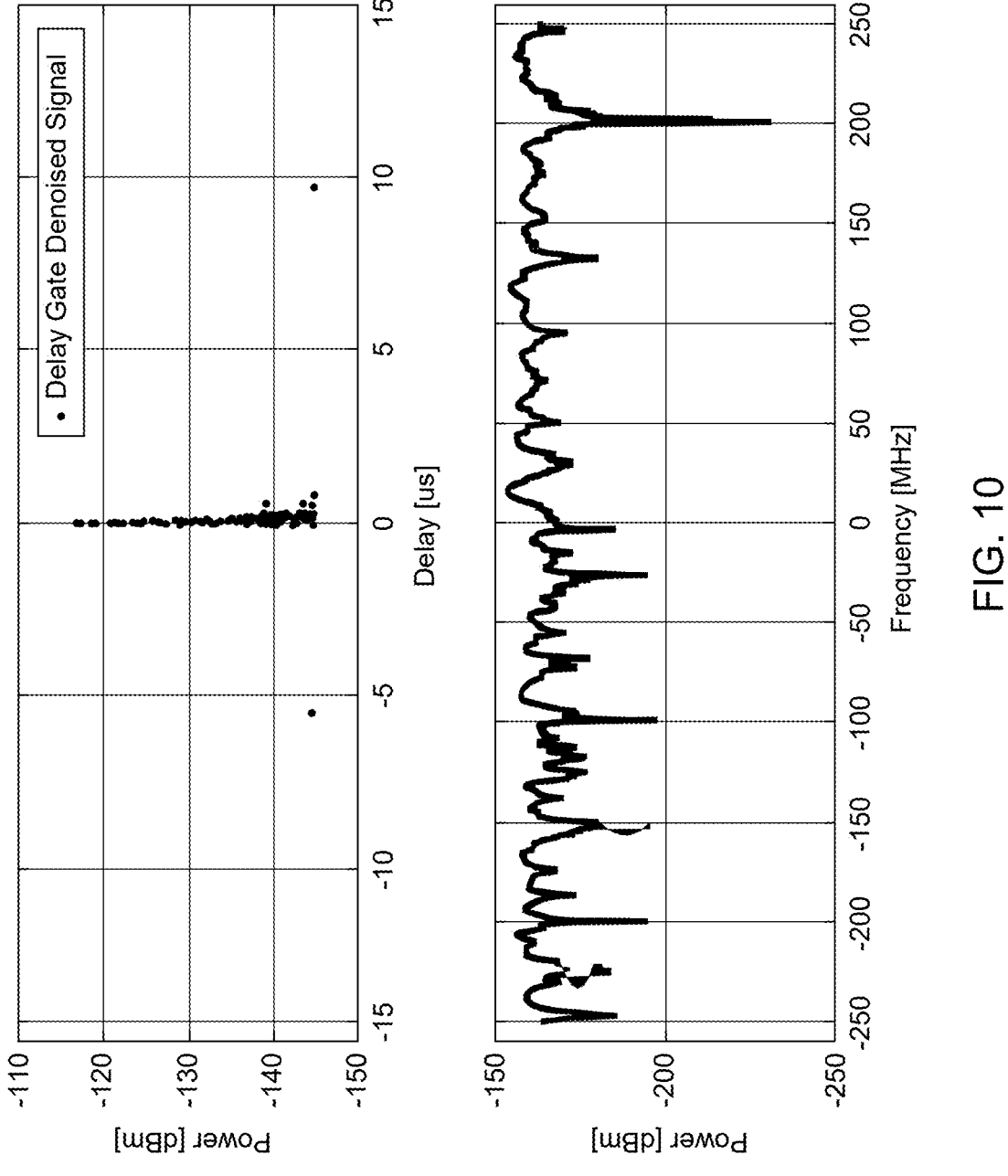
FIG. 10 illustrates an intermediate denoised signal according to one or more embodiments.

FIG. 10 illustrates the intermediate denoised signal according to one or more embodiments. FIG. 10 illustrates the intermediate denoised signal generated at 620 using the one or more delay gates.

Figure 11:
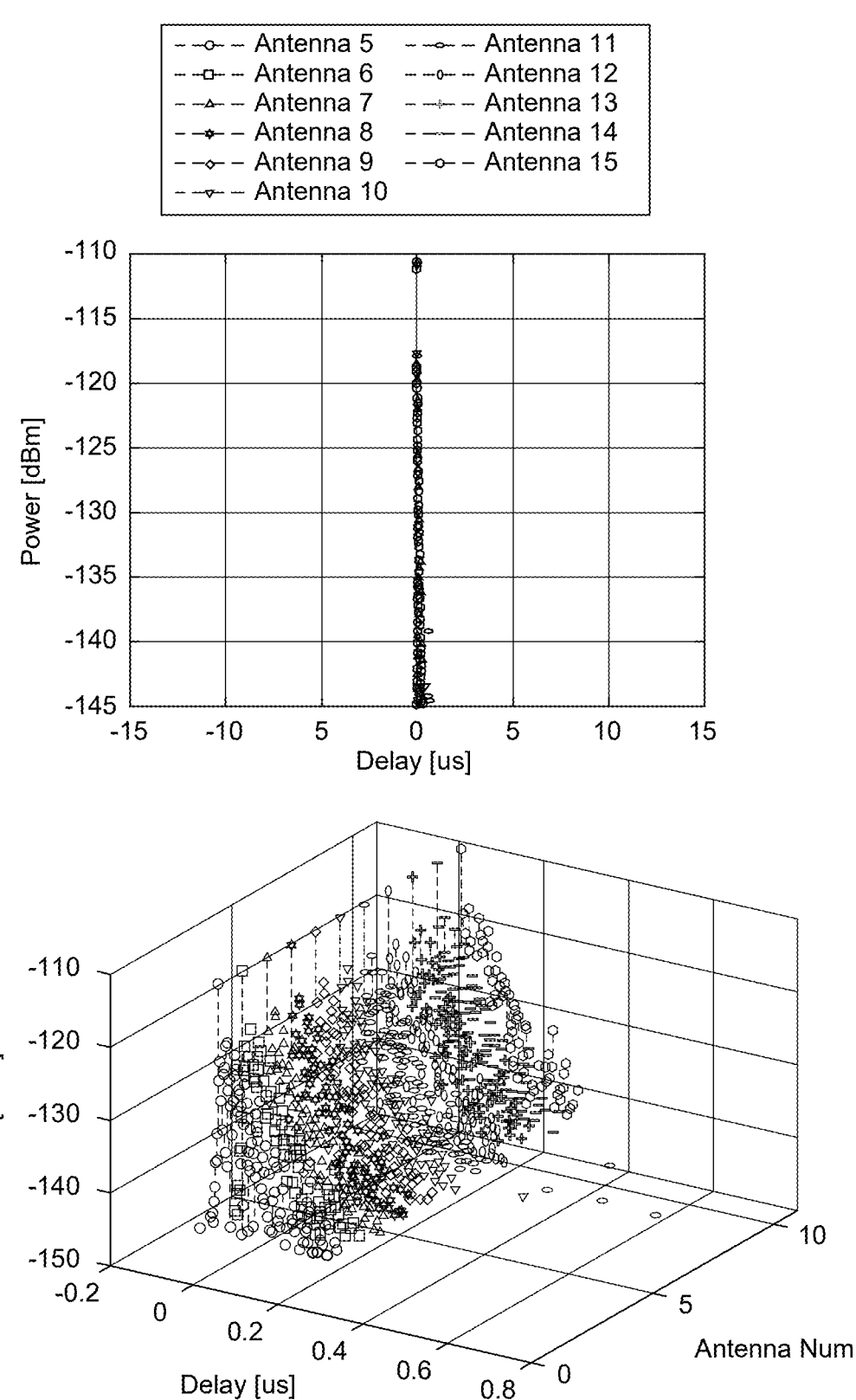
FIG. 11 illustrates a final denoised PDP in the time domain according to one or more embodiments.
Figure 12:
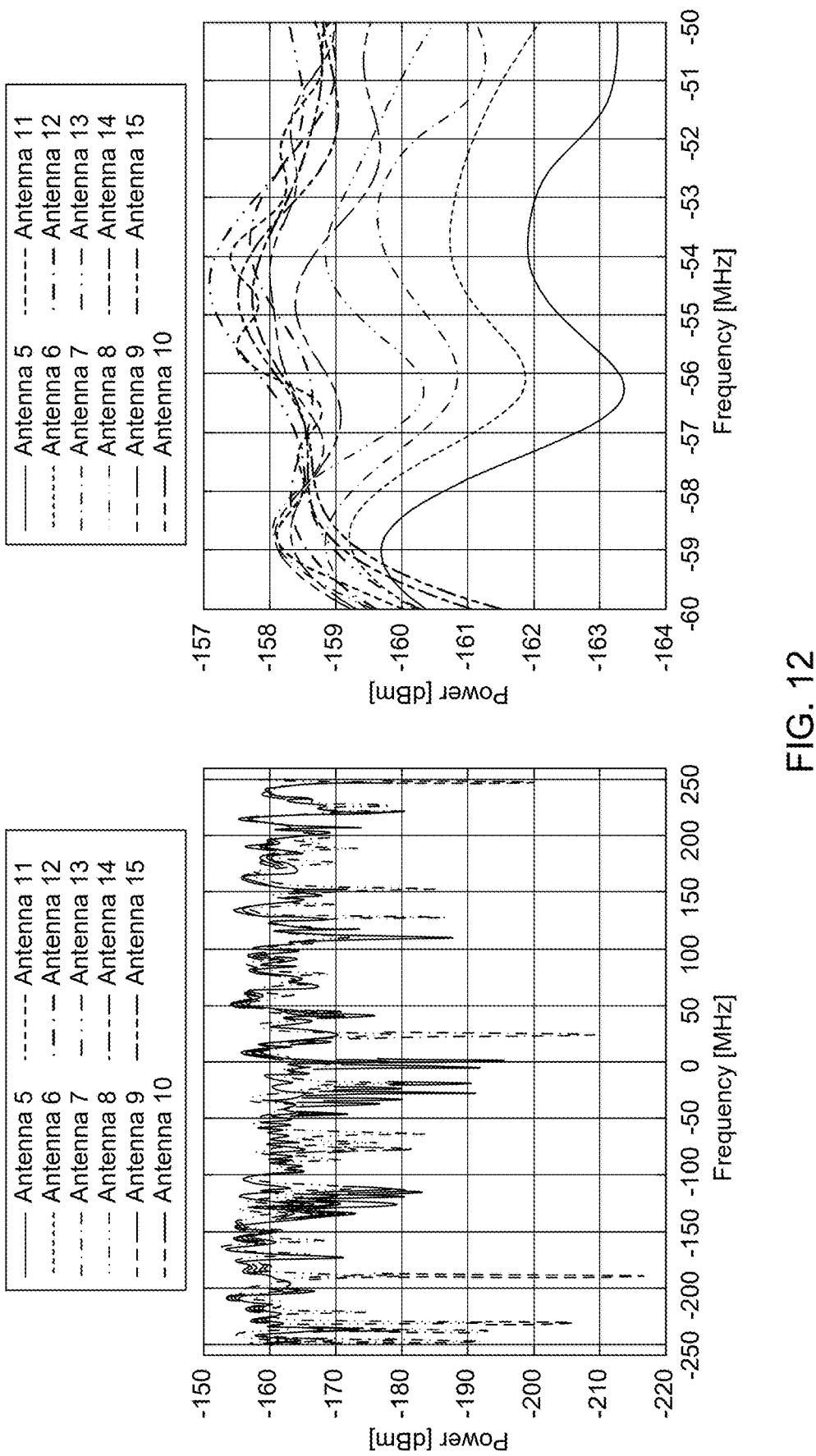
FIG. 12 illustrates a final denoised CTF in the frequency domain according to one or more embodiments.

FIG. 11 illustrates the final denoised signal in the time domain according to one or more embodiments. FIG. 12 illustrates the final denoised signal in the frequency domain according to one or more embodiments. The final denoised signal is generated at 630 by applying the persistence check on the MPCs.

Figure 13:
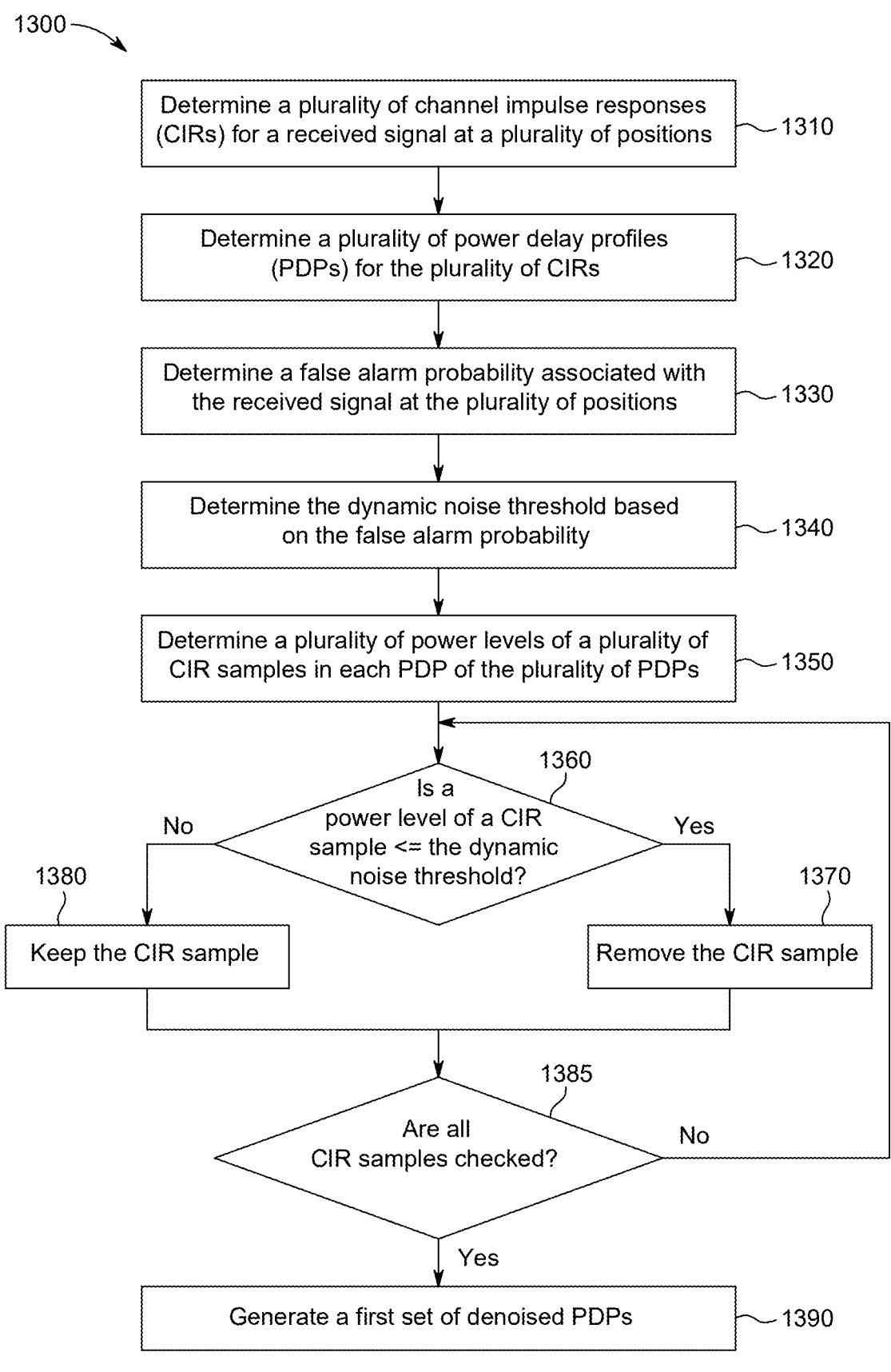
FIG. 13 is a flowchart illustrating a process of noise removal using a dynamic noise threshold according to one or more embodiments.

Referring now to FIG. 13, a flowchart illustrating a process of noise removal using the dynamic noise threshold is shown according to one or more embodiments.

At 1310, the signal is received at multiple positions. For instance, the signal may be received using the VCA. A receiver apparatus may use a single antenna that moves sequentially to each position on the VCA and/or a multi-antenna array that simultaneously captures signals at multiple positions. A CIR is derived for the signal received at each position. The CIR may represent information about arrival time, amplitude, and/or phases of multiple signal paths, and/or MPCs, from a transmitter apparatus to the receiver apparatus. Using correlation and/or Fourier transforms, the receiver apparatus may compare the received signal with a known reference signal (e.g. a signal transmitted by the transmitter apparatus). In an example, the CIR collection separation distance is in the order of wavelength or sub-wavelength.

At 1320, a PDP is generated for each CIR. The PDP may be derived by squaring the magnitude of each component in the CIR.

At 1330, the false alarm probability may be determined to minimize the likelihood of incorrectly identifying noise samples in the PDPs. The receiver apparatus may calculate the false alarm probability based on a statistical analysis of the noise in the PDPs at each position. By estimating the statistical characteristics of the noise, such as maximum and/or minimum noise power levels, at 1340, the dynamic noise threshold may be determined.

At 1350, the receiver apparatus may determine a plurality of power levels of a plurality of CIR samples in each PDP of the plurality of PDPs.

At 1360, the receiver apparatus may compare the power levels of the CIR samples with the dynamic noise threshold. At 1370, the CIR samples having power levels less than or equal to the dynamic noise threshold may be identified as noise and may be discarded. At 1380, the CIR samples having a power level more than the dynamic noise threshold may be maintained.

At 1385, the receiver apparatus may ensure that the dynamic noise threshold is applied to all the CIR samples. At 1390, the receiver apparatus may generate the initial denoised signal comprising the first set of denoised PDPs.

Referring now to FIG. 14, a flowchart illustrating a process of noise removal by applying the delay bin is shown according to one or more embodiments.

At 1410, the receiver apparatus identifies the peaks in the first set of denoised PDPs, i.e. in the initial denoised signal. The peaks may correspond to the MPCs in the received signal. The receiver apparatus may identify one or more MPCs associated with each antenna position in the VCA.

At 1420, the strongest MPC in each PDP of the first set of denoised PDPs may be identified. In an example, the strongest peak may be associated with a direct signal and/or LOS whereas other peaks may be associated with reflected signals and/or NLOS.

At 1430, for each PDP, the delay bin may be centered around the strongest MPC. The MPC may be centered at delay zero, the first delay gate may be applied before the MPC and the second delay gate may be applied after the MPC.

At 1440, all the CIR samples from the first set of denoised PDPs falling outside of the delay bin may be identified as noise and may be removed.

The receiver apparatus may generate the intermediate denoised signal comprising the second set of denoised PDPs.

Referring now to FIG. 15, a flowchart illustrating a process of noise removal using the persistence check is shown according to one or more embodiments.

At 1510, the receiver apparatus may determine the predetermined number of contiguous and/or neighboring positions to identify persistence for the MPCs. The receiver apparatus may evaluate each MPC across multiple positions. If the MPC appears consistently across the predetermined number of contiguous and/or neighboring PDPs, the MPC may be identified as persistent.

At 1520, the receiver apparatus may determine the predetermined number of delay bins to identify persistence for the MPCs. The receiver apparatus may evaluate each MPC across multiple delay bins in multiple PDPs. If the MPC appears consistently across the predetermined number of delay bins in multiple PDPs of the second set of denoised PDPs, the MPC may be identified as persistent.

At 1530, the receiver apparatus may filter the second set of denoised PDPs based on the one or more persistent MPCs to generate the final denoised signal.

What is claimed is:

1. An apparatus, comprising:
a memory;
a transceiver comprising:
at least one antenna configured to:
receive a signal at a plurality of positions; and
a processor, wherein the transceiver and the processor are configured to:
determine a plurality of channel impulse responses (CIRs) for the received signal at the plurality of positions,
determine a plurality of power delay profiles (PDPs) for the plurality of CIRs,
apply a dynamic noise threshold to the plurality of PDPs to generate a first set of denoised PDPs,
identify a first set of multi-path components (MPCs) in the first set of denoised PDPs,
apply at least one delay gate around one or more MPCs of the first set of MPCs to generate a second set of denoised PDPs,
identify one or more persistent MPCs from the second set of denoised PDPs, and
filter the second set of denoised PDPs based on the one or more persistent MPCs to generate at least one denoised signal.

2. The apparatus of claim 1, wherein the processor is further configured to:
determine a false alarm probability associated with the received signal at the plurality of positions, and
determine the dynamic noise threshold based on the false alarm probability.

3. The apparatus of claim 2, wherein applying the dynamic noise threshold comprises:
determining a plurality of power levels of a plurality of CIR samples in each PDP of the plurality of PDPs,
comparing the plurality of power levels with the dynamic noise threshold, and
removing one or more CIR samples of the plurality of CIR samples having one or more power levels lesser than the dynamic noise threshold.

4. The apparatus of claim 3, wherein the false alarm probability is a predetermined percentile within a noise distribution of the plurality of CIR samples.

5. The apparatus of claim 1, wherein applying the at least one delay gate comprises:
identifying a strongest MPC in each PDP of the first set of denoised PDPs,
centering, around the strongest MPC, a delay bin comprising a first delay gate before the strongest MPC and a second delay gate after the strongest MPC, and
removing one or more CIR samples from the first set of denoised PDPs falling outside the delay bin.

6. The apparatus of claim 5, wherein identifying the one or more persistent MPCs comprises:
determining that the one or more persistent MPCs are observed in a predetermined number of PDPs associated with a predetermined number of contiguous positions of the plurality of positions.

7. The apparatus of claim 5, wherein identifying the one or more persistent MPCs comprises:

determining that the one or more persistent MPCs are observed at a predetermined number of contiguous delay bins associated with a predetermined number of contiguous positions.

8. The apparatus of claim 1, wherein the apparatus is a channel sounding apparatus.

9. The apparatus of claim 1, wherein the at least one antenna is an antenna rotated through the plurality of positions along at least one of: a circumference of a circle, a line, or a curve.

10. The apparatus of claim 1, wherein the at least one antenna is at least one of: an antenna array or a virtual circular array.

11. A method, comprising:

receiving a signal by at least one antenna at a plurality of positions;

determining a plurality of channel impulse responses (CIRs) for the received signal at the plurality of positions;

determining a plurality of power delay profiles (PDPs) for the plurality of CIRs;

applying a dynamic noise threshold to the plurality of PDPs for generating a first set of denoised PDPs;

identifying a first set of multi-path components (MPCs) in the first set of denoised PDPs;

applying at least one delay gate around one or more MPCs of the first set of MPCs to generate a second set of denoised PDPs;

identifying one or more persistent MPCs from the second set of denoised PDPs; and filtering the second set of denoised PDPs based on the one or more persistent MPCs for generating at least one denoised signal.

12. The method of claim 11, the method further comprising:

determining a false alarm probability associated with the received signal at the plurality of positions; and determining the dynamic noise threshold based on the false alarm probability.

13. The method of claim 12, wherein applying the dynamic noise threshold comprises:

determining a plurality of power levels of a plurality of CIR samples in each PDP of the plurality of PDPs;

comparing the plurality of power levels with the dynamic noise threshold; and removing one or more CIR samples of the plurality of CIR samples having one or more power levels lesser than the dynamic noise threshold.

14. The method of claim 13, wherein the false alarm probability is a predetermined percentile within a noise distribution of the plurality of CIR samples.

15. The method of claim 11, wherein applying the at least one delay gate comprises:

identifying a strongest MPC in each PDP of the first set of denoised PDPs;

centering, around the strongest MPC, a delay bin comprising a first delay gate before the strongest MPC and a second delay gate after the strongest MPC; and removing one or more CIR samples from the first set of denoised PDPs falling outside the delay bin.

16. The method of claim 15, wherein identifying the one or more persistent MPCs comprises:

determining that the one or more persistent MPCs are observed in a predetermined number of PDPs associated with a predetermined number of contiguous positions of the plurality of positions.

17. The method of claim 15, wherein identifying the one or more persistent MPCs comprises:

determining that the one or more persistent MPCs are observed at a predetermined number of contiguous delay bins associated with a predetermined number of contiguous positions.

18. The method of claim 11, wherein the method is performed by a channel sounding apparatus.

19. The method of claim 11, wherein the at least one antenna is an antenna rotated through the plurality of positions along at least one of: a circumference of a circle, a line, or a curve.

20. The method of claim 11, wherein the at least one antenna is at least one of: an antenna array or a virtual circular array.

* * * * *